US011093430B2

(12) United States Patent
Lin

(10) Patent No.: US 11,093,430 B2
(45) Date of Patent: Aug. 17, 2021

(54) USB EXTENSION CORD

(71) Applicant: Ling Yung Lin, Taipei (TW)

(72) Inventor: Ling Yung Lin, Taipei (TW)

( * ) Notice: Subject to any disclaimer, the term of this patent is extended or adjusted under 35 U.S.C. 154(b) by 0 days.

(21) Appl. No.: 16/824,046

(22) Filed: Mar. 19, 2020

(65) Prior Publication Data

US 2021/0056065 A1    Feb. 25, 2021

(30) Foreign Application Priority Data

Aug. 20, 2019  (CN) .......................... 201921346035.5

(51) Int. Cl.
| | |
|---|---|
| *G06F 13/40* | (2006.01) |
| *G06F 13/38* | (2006.01) |
| *G06F 13/42* | (2006.01) |
| *H01R 11/00* | (2006.01) |
| *H01R 25/00* | (2006.01) |

(52) U.S. Cl.
CPC ........ *G06F 13/4068* (2013.01); *G06F 13/382* (2013.01); *G06F 13/4282* (2013.01); *H01R 11/00* (2013.01); *H01R 25/003* (2013.01); *G06F 2213/0042* (2013.01)

(58) Field of Classification Search
CPC ............. G06F 13/4068; G06F 13/4282; G06F 13/382; G06F 2213/0042; H01R 11/00; H01R 25/003
See application file for complete search history.

(56) References Cited

U.S. PATENT DOCUMENTS

| | | | | |
|---|---|---|---|---|
| 5,236,374 A | * | 8/1993 | Leonard ................. | H01R 31/02 439/505 |
| 5,902,148 A | * | 5/1999 | O'Rourke ............ | H01R 25/003 439/505 |
| 7,347,734 B1 | * | 3/2008 | Teitelbaum ............ | H01R 25/00 439/652 |
| 7,544,100 B2 | * | 6/2009 | Teitelbaum ............ | H01R 24/22 439/652 |
| D747,722 S | * | 1/2016 | Webb ..................... | H01R 24/22 D14/433 |
| 2004/0014336 A1 | * | 1/2004 | Merz ..................... | H01R 13/659 439/76.1 |
| 2008/0012423 A1 | * | 1/2008 | Mimran ............... | H01R 31/065 307/11 |
| 2008/0239681 A1 | * | 10/2008 | Iida ....................... | G06F 13/387 361/752 |

(Continued)

FOREIGN PATENT DOCUMENTS

WO    WO-2005071795 A1 *  8/2005  ........... H01R 25/003

*Primary Examiner* — Glenn A. Auve
(74) *Attorney, Agent, or Firm* — Rabin & Berdo, P.C.

(57) ABSTRACT

A USB (Universal Serial Bus) extension cord includes a connection cable, a male connector base, and a plurality of female connector housings. The male connector base is provided at one end of the connection cable, and the female connector housings are provided elsewhere on the connection cable at intervals. The male connector base is provided with a male USB connector, and each female connector housing is formed with at least one female USB connector. As each two adjacent female connector housings can be brought as far away from, and as close to, each other as the connection cable allows, the female connector housings can be easily arranged at appropriate positions in an environment to facilitate the use of low-voltage electricity.

15 Claims, 5 Drawing Sheets

(56) References Cited

U.S. PATENT DOCUMENTS

| | | | |
|---|---|---|---|
| 2012/0052742 A1* | 3/2012 | Lau | H01R 12/707 |
| | | | 439/660 |
| 2014/0004718 A1* | 1/2014 | Hsu | H01R 25/003 |
| | | | 439/10 |
| 2016/0294127 A1* | 10/2016 | Mouradian | H01R 13/72 |
| 2016/0294133 A1* | 10/2016 | Xie | H01R 27/02 |
| 2017/0214196 A1* | 7/2017 | Hernandez | H01R 13/6675 |
| 2018/0062302 A1* | 3/2018 | DeBlois | H01R 13/514 |
| 2019/0027944 A1* | 1/2019 | Grzybowski | H02J 7/00 |
| 2020/0191345 A1* | 6/2020 | Chien | F21V 21/22 |

* cited by examiner

USB EXTENSION CORD

BACKGROUND OF THE INVENTION

1. Technical Field

The present invention relates to a USB (Universal Serial Bus) distributor and more particularly to a USB extension cord that includes a male connector base and a plurality of female connector housings connected in series along a connection cable.

2. Description of Related Art

For decades, home appliances have mostly been powered through the conventional power sockets (e.g., those of 120V AC), either directly or by way of a conventional extension cord. The conventional extension cords, however, are not suitable by themselves for low-voltage appliances that have recently come into extensive use, such as tablet computers and other mobile devices; additional power transformation is typically required. For example, low-voltage decorative lights that are widely used for festive occasions (e.g., LED string lights that are hung along the eaves or on Christmas trees in celebration of Christmas, Halloween, or Easter) generally have to be connected to mains electricity through a transformer in addition to a conventional extension cord or be powered by an external battery box, which is a low-voltage power source; in either case, the required power supply arrangement tends to complicate the installation of the decorative lights.

Furthermore, as low-voltage USB-based electronic or electrical appliances are nowadays widely used in domestic settings, many people have USB-based power adapters or power banks at home. Nevertheless, the use of those adapters or power banks has spatial limitations. A device or cord that can provide low-voltage power and be easily and widely arranged in its user's or users' living environment has yet to be found. In view of this, the inventor of the present invention conducted an extensive research and experiment and finally succeeded in developing a USB extension cord as disclosed herein.

BRIEF SUMMARY OF THE INVENTION

The primary objective of the present invention is to provide a USB extension cord in which a male USB connector and a plurality of female USB connectors are connected and arranged along a connection cable, and in which each female USB connector has the same output specifications (i.e., voltage and current specifications) as a conventional USB port. The female USB connectors can be brought as far away from, and as close to, one another as the connection cable allows, and thus easily arranged at appropriate positions in an environment to facilitate the use of low-voltage electricity in that environment.

To achieve the above objective and effect, the major technical means and structural features of the USB extension cord of the present invention include a connection cable, a male connector base, and a plurality of female connector housings. The connection cable includes a first end and a second end. The male connector base is provided at the first end of the connection cable and has a side that is away from the connection cable and protrudingly provided with a male USB connector. The male USB connector is electrically connected to the first end of the connection cable inside the male connector base. The female connector housings are provided on the connection cable at intervals. One of the female connector housings is located at the second end of the connection cable while the other female connector housings are located between the first end and the second end of the connection cable. Each female connector housing has a lateral side formed with at least one female USB connector, wherein the female USB connector is electrically connected to the connection cable inside the female connector housing.

In the structure described above, the connection cable at least includes two wires for guiding electric current, namely a wire connected to VCC pins and a wire connected to GND pins. And more preferably, the connection cable may include four wires, two of the wires for guiding electric current (namely a wire connected to VCC pins and a wire connected to GND pins) and the other two of the wires for guiding signals (namely a wire connected to D+ pins and a wire connected to D– pins) so that, in addition to providing electric power, the connection cable can guide control signals to meet the requirements of certain products (e.g., decorative string lights).

In the structure described above, each female connector housing may be formed with two female USB connectors.

In the structure described above, each female connector housing may have two opposite lateral sides each formed with at least one female USB connector.

In the structure described above, the female connector housings may be so configured that they can be coupled to one another, and thus gathered together, in a detachable manner, thereby allowing a user to bring together or deploy the female connector housings as appropriate to the user's environment.

In the structure described above, each female connector housing may be provided with a coupling portion and a to-be-coupled-to portion configured to be coupled to the coupling portion of an adjacent female connector housing.

In the structure described above, each female connector housing may have an outer side provided with at least one coupling or positioning portion that has a joining or secure attachment function.

In the structure described above, each coupling portion may be an engaging groove, and each to-be-coupled-to portion may be an engaging block.

In the structure described above, each female connector housing may be a metal housing whose outer surface has an insulating plastic coating.

In the structure described above, each female connector housing may be an insulating plastic housing.

In the structure described above, and to meet user needs in a general environment, the length of the connection cable is preferably 2 m, 3 m, or 5 m; the number of the female connector housings may range from five to ten; and the distance between each two adjacent female connector housings along the connection cable may range from 30 cm to 50 cm.

In the structure described above, the male USB connector may be of Type A, Type B, or Type C.

In the structure described above, the female USB connectors may be of any one, or an arbitrary combination of at least two, of Type A, Type B, and Type C.

BRIEF DESCRIPTION OF THE SEVERAL VIEWS OF THE DRAWINGS

The objectives, effects, and technical features of the present invention can be better understood by referring to the following detailed description of some illustrative embodiments in conjunction with the accompanying drawings, in which.

DETAILED DESCRIPTION OF THE INVENTION

Figure 1:
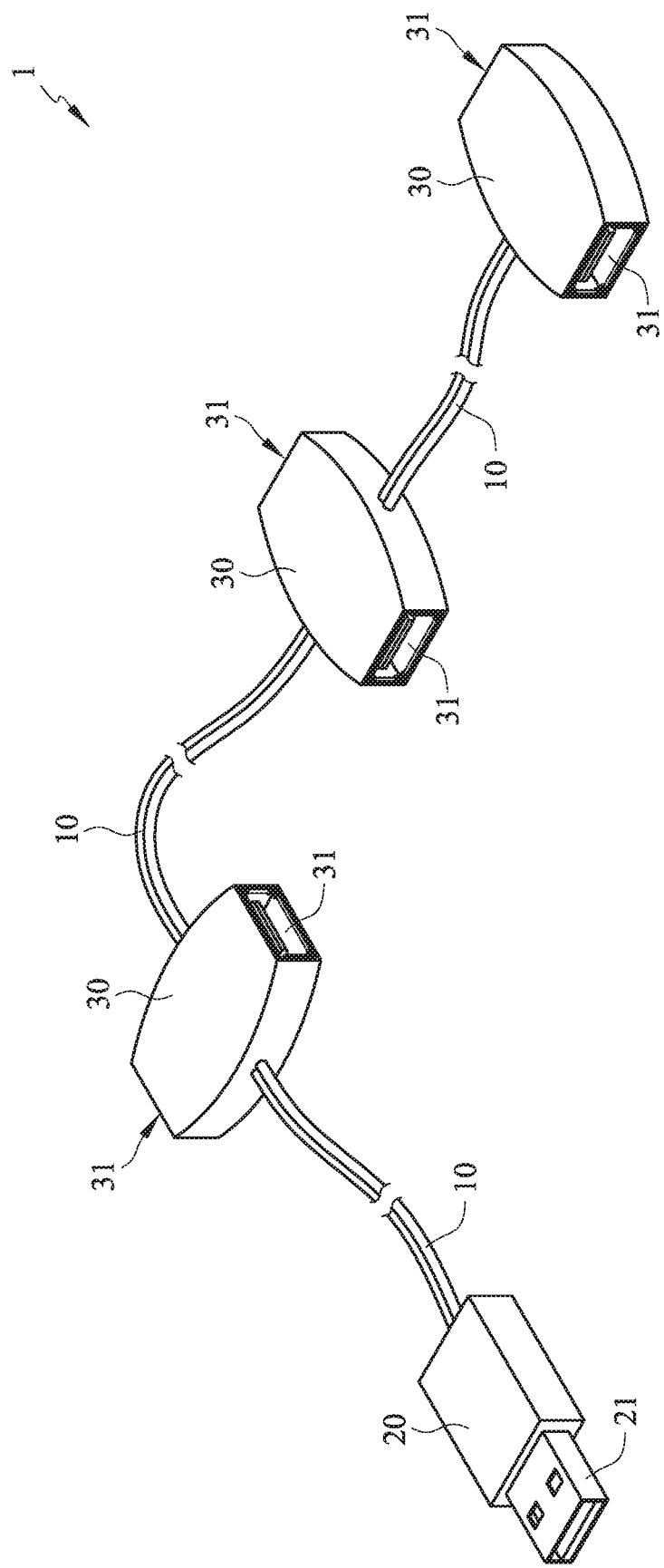
FIG. 1 is a perspective view of an embodiment of the invention.

Referring to FIG. 1, the USB extension cord 1 according to an embodiment of the present invention essentially includes a connection cable 10, a male connector base 20, and a plurality of female connector housings 30.

The connection cable 10 is a continuous cable (see also FIG. 2 and FIG. 3) and has a first end and a second end, with the first end joined to the male connector base 20, and the second end joined to one of the female connector housings 30.

Figure 2:
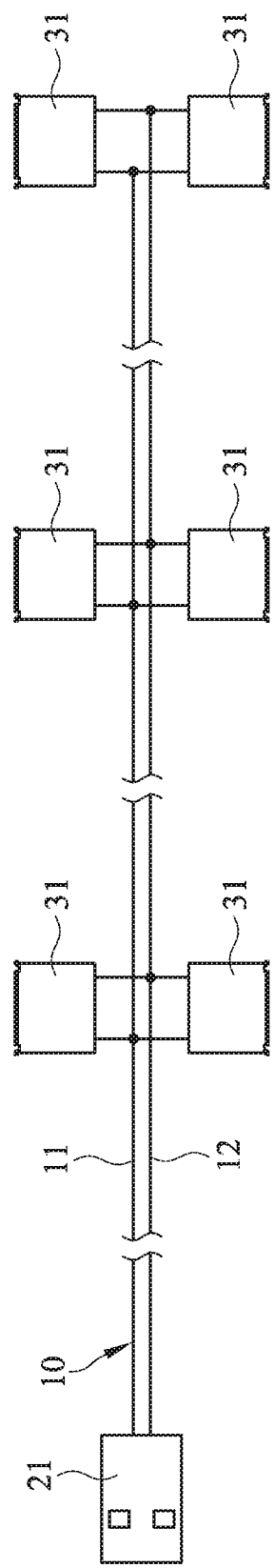
FIG. 2 schematically shows the wire layout in the connection cable in an embodiment of the invention.
Figure 3:
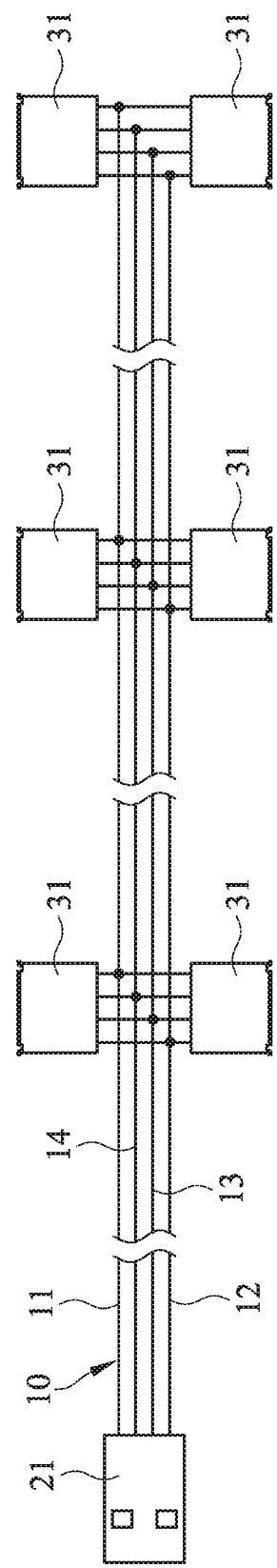
FIG. 3 schematically shows the wire layout in the connection cable in another embodiment of the invention.

As shown in FIG. 2 and FIG. 3, the male connector base 20 is located at the first end of the connection cable 10, and one side of the male connector base 20 that is away from the connection cable 10 is protrudingly provided with a male USB connector 21. The male USB connector 21 is electrically connected to the first end of the connection cable 10 inside the male connector base 20. The female connector housings 30 are provided on the connection cable 10 at intervals. One of the female connector housings 30 is located at the second end of the connection cable 10 while the remaining female connector housings 30 are distributed between the first end and the second end of the connection cable 10. More specifically, the female connector housings 30 are distributed along and penetrated by the connection cable 10. Each female connector housing 30 is formed with a female USB connector 31 on each of two opposite lateral sides. Each female USB connector 31 is electrically connected to the connection cable 10 inside the corresponding female connector housing 30. The two female USB connectors 31 in each female connector housing 30 are electrically connected in parallel to the connection cable 10.

In one feasible embodiment, the connection cable 10 is configured as shown in FIG. 2 and includes two wires for guiding electric current, i.e., a wire connected to the VCC pins and a wire connected to the GND pins. In another feasible embodiment, the connection cable 10 is configured as shown in FIG. 3 and includes four wires, or more particularly two wires for guiding electric current (i.e., a wire connected to the VCC pins and a wire connected to the GND pins) and two wires for guiding signals (i.e., a wire connected to the D+ pins and a wire connected to the D− pins); thus, in addition to providing the electric power needed, the connection cable 10 can provide the control signals required in certain products (e.g., decorative string lights) and therefore have a wide variety of applications.

In practice, each female connector housing 30 may be provided with more or less female USB connectors 31 than stated above. For instance, each female connector housing 30 may be provided with only one female USB connector 31, or each female connector housing 30 may be provided with two female USB connectors 31 on each of two opposite lateral sides. To meet user needs in a general environment, and taking into account such factors as power supply efficiency, it is preferable that the length of the connection cable 10 does not exceed 10 m (e.g., being 2 m, 3 m, or 5 m); that there are five to ten female connector housings 30 on the connection cable 10; that each female connector housing 30 is provided with two female USB connectors 31; and that the distance between each two adjacent female connector housings 30 along the connection cable 10 is 30 cm to 50 cm.

Each female connector housing 30 may be a plastic housing made of an insulating plastic material to ensure safety of use. Alternatively, each female connector housing 30 may be a metal housing made of a durable metal material and have an insulating plastic coating on the outer surface in order for the end product to be both durable and safe.

In one feasible embodiment, the male USB connector 21 and the female USB connectors 31 may have the same specifications or have different specifications respectively. The aforesaid specifications at least include such common specifications as the USB Type-A, Type-B, and Type-C specifications ("USB TYPE-C" is also a registered trademark of USB Implementers Forum). The female USB connectors 31 on the USB extension cord 1 may be of an arbitrary combination of different specifications. For example, the USB extension cord 1 may be provided with at least one Type-A female USB connector 31, at least one Type-B female USB connector 31, and at least one Type-C female USB connector 31.

Figure 4:
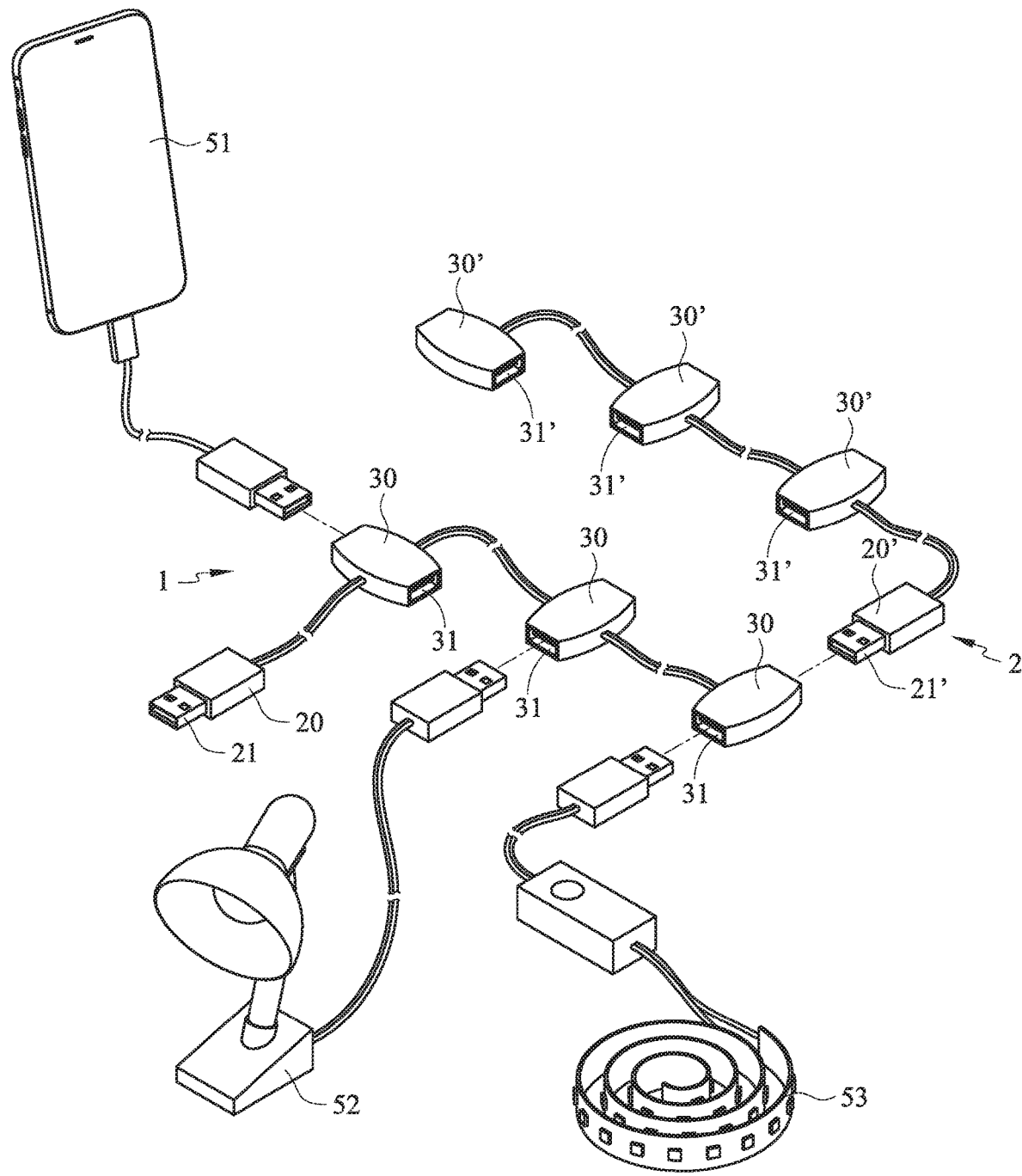
FIG. 4 shows a state of use of some embodiments of the invention.

In terms of use, referring to FIG. 4, the male USB connector 21 of the USB extension cord 1 is connected to a power supply end in order to draw electricity therefrom. The female connector housings 30 can be arranged as needed at different positions in the environment where the USB extension cord 1 is used, in order to make low-voltage electricity simultaneously available to a plurality of users at various positions, and to a diversity of products such as electronic products (e.g., a tablet computer or a mobile device 51), electrical appliances (e.g., an electric fan or a desk lamp 52), and decorative string lights 53 for festive occasions. When more USB connectors than provided by a single USB extension cord 1 are needed, the series-connected configuration of the present invention makes it possible to connect a plurality of USB extension cords 1 and 2 as shown in FIG. 4, with the male USB connector 21' on the male connector base 20' of the USB extension cord 2 connected to an arbitrary female USB connector 31 of the USB extension cord 1 so that the female connector housings 30' and the female USB connectors 31' of the USB extension cord 2 can reach farther than their counterparts of the USB extension cord 1.

Figure 5:
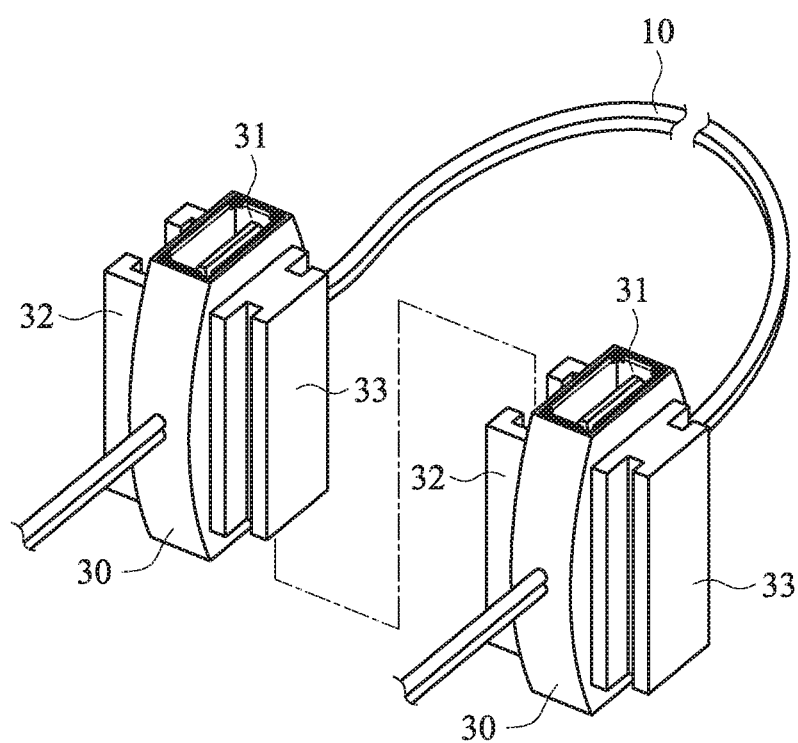
FIG. 5 shows an embodiment of the invention in which each female connector housing is provided with coupling structures.
Figure 6:
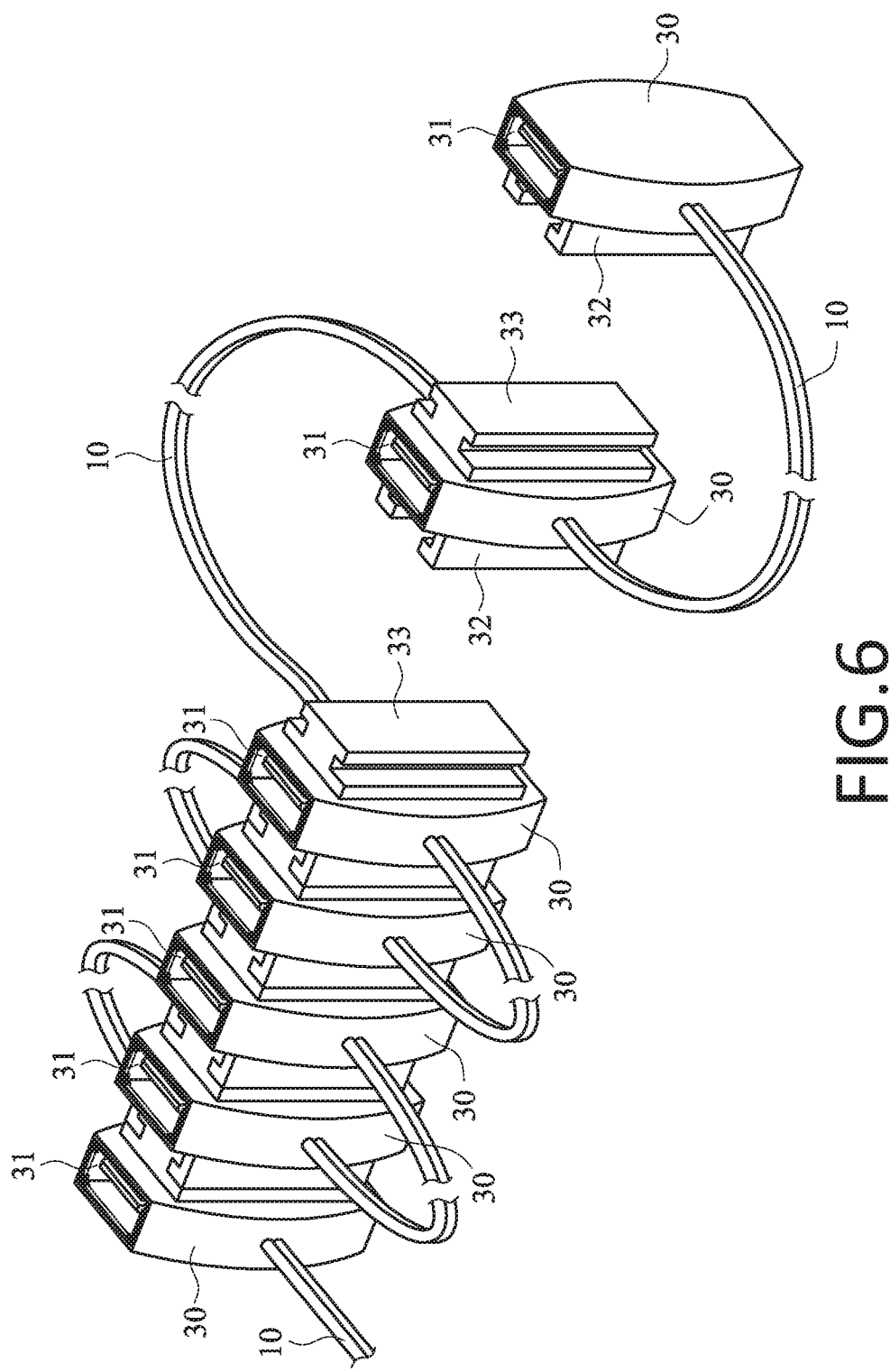
FIG. 6 shows how the female connector housings in the embodiment in FIG. 5 are coupled together.

In one feasible embodiment of the present invention, the female connector housings 30 may have structural designs that provide a joining or secure attachment function to facilitate use of the USB extension cord 1. Such structures may either enable the female connector housings 30 to be coupled to one another in a detachable manner (see FIG. 5 and FIG. 6), or be coupling or positioning portions that allow the female connector housings 30 to be secured in place when in a distributed configuration (e.g., simple hanging rings with which the female connector housings 30 can be easily hung at predetermined positions respectively when in a distributed configuration). In FIG. 5 and FIG. 6, each female connector housing 30 of the USB extension cord 1 is provided with a coupling portion 32 and a to-be-coupled-to portion 33 configured to be coupled to the coupling portion 32 of an adjacent female connector housing 30. More specifically, each coupling portion 32 is an engaging groove, and each to-be-coupled-to portion 33 is an engaging block. The coupling portions 32 and the to-be-coupled-to portions 33 allow the USB extension cord 1 to stay in a folded state or be unfolded as needed during use, thereby preventing the hazards associated with a loose cord. Moreover, the engaging grooves and the engaging blocks may work with other accessories (e.g., suction cups with a corresponding engaging block or engaging groove) so that the female connector housings 30 can be easily secured at predetermined positions when in a distributed configuration.

According to the above, the present invention is indeed capable of providing electricity and/or signals to multiple points at the same time in a plug-and-play manner, and allows lateral extension, securing in place, and gathering together. Thus, the invention satisfies the need for simultaneous output to fixed points over a long distance or wide area and is both novel and non-obvious. A patent application for the invention, therefore, is hereby filed according to law. It should be pointed out that the embodiments described herein are only some preferred ones of the invention. Any extension, modification, simple variation, or equivalent substitution based on the technical means of the invention shall fall within the scope of the appended claims.

What is claimed is:

1. A USB (Universal Serial Bus) extension cord, comprising:
   a connection cable including a first end and a second end;
   a male connector base provided at the first end of the connection cable, wherein the male connector base has a side that is away from the connection cable and protrudingly provided with a male USB connector, and the male USB connector is electrically connected to the first end of the connection cable inside the male connector base; and
   a plurality of female connector housings provided on the connection cable at intervals, wherein one of the female connector housings is located at the second end of the connection cable, the other female connector housings are located between the first end and the second end, each said female connector housing has a lateral side formed with at least one female USB connector, and each said female USB connector is electrically connected to the connection cable inside a corresponding one of the female connector housings, wherein the female connector housings are configured to be coupled to one another, and thus gathered together, in a detachable manner.

2. The USB extension cord of claim 1, wherein the connection cable comprises two wires for guiding electric current, and the two wires are connected to VCC pins and GND pins respectively.

3. The USB extension cord of claim 1, wherein the connection cable includes two wires for guiding electric current and two wires for guiding signals, the two wires for guiding electric current are connected to VCC pins and GND pins respectively, and the two wires for guiding signals are connected to D+ pins and D− pins respectively.

4. The USB extension cord of claim 1, wherein each said female connector housing is formed with two said female USB connectors.

5. The USB extension cord of claim 1, wherein each said female connector housing has two opposite lateral sides each formed with at least one said female USB connector.

6. The USB extension cord of claim 1, wherein each said female connector housing is provided with a coupling portion and a to-be-coupled-to portion configured to be coupled to the coupling portion of an adjacent said female connector housing.

7. The USB extension cord of claim 6, wherein each said coupling portion is an engaging groove, and each said to-be-coupled-to portion is an engaging block.

8. The USB extension cord of claim 1, wherein each said female connector housing has an outer side provided with at least one coupling or positioning portion having a joining or secure attachment function.

9. The USB extension cord of claim 1, wherein each said female connector housing is a metal housing having an outer surface with an insulating plastic coating.

10. The USB extension cord of claim 1, wherein each said female connector housing is an insulating plastic housing.

11. The USB extension cord of claim 1, wherein the connection cable has a length of 2 m, 3 m, or 5 m.

12. The USB extension cord of claim 11, wherein there are five to ten said female connector housings.

13. The USB extension cord of claim 11, wherein each two adjacent said female connector housings are spaced apart by 30 cm to 50 cm along the connection cable.

14. The USB extension cord of claim 1, wherein the male USB connector is of Type A, Type B, or Type C.

15. The USB extension cord of claim 1, wherein the female USB connectors are of one, or a combination of at least two, of Type A, Type B, and Type C.

\* \* \* \* \*